United States Patent
Ford, III et al.

(10) Patent No.: US 12,518,347 B2
(45) Date of Patent: Jan. 6, 2026

(54) SYSTEMS AND METHODS FOR IDENTIFYING AND CORRECTING BLURRED COMPONENTS WITHIN IMAGES

(71) Applicant: Capital One Services, LLC, McLean, VA (US)

(72) Inventors: Joseph James Ford, III, Manakin Sabot, VA (US); Thomas Oliver Cantrell, Maidens, VA (US)

(73) Assignee: Capital One Services, LLC, McLean, VA (US)

( * ) Notice: Subject to any disclaimer, the term of this patent is extended or adjusted under 35 U.S.C. 154(b) by 665 days.

(21) Appl. No.: 17/820,922

(22) Filed: Aug. 19, 2022

(65) Prior Publication Data
US 2024/0062338 A1 Feb. 22, 2024

(51) Int. Cl.
*G06T 5/50* (2006.01)
*G06T 5/73* (2024.01)
*G06V 30/12* (2022.01)

(52) U.S. Cl.
CPC .............. *G06T 5/50* (2013.01); *G06T 5/73* (2024.01); *G06V 30/133* (2022.01)

(58) Field of Classification Search
None
See application file for complete search history.

(56) References Cited

U.S. PATENT DOCUMENTS

| | | | | |
|---|---|---|---|---|
| 12,033,372 | B2* | 7/2024 | Adato | G06V 10/82 |
| 12,142,029 | B2* | 11/2024 | Adato | G06V 10/7788 |
| 2021/0081695 | A1* | 3/2021 | Wang | G06V 20/63 |
| 2021/0325308 | A1* | 10/2021 | Kannan | G01N 21/6458 |
| 2022/0156891 | A1* | 5/2022 | Chi | G06N 3/08 |
| 2023/0154153 | A1* | 5/2023 | Adato | G06T 19/20 |
| | | | | 382/159 |
| 2024/0062338 | A1* | 2/2024 | Ford, III | G06V 30/19067 |

OTHER PUBLICATIONS

International Search Report and Written Opinion issued in International Application No. PCT/US2023/071372 on Nov. 27, 2023 (10 pages).

* cited by examiner

*Primary Examiner* — Tahmina N Ansari
(74) *Attorney, Agent, or Firm* — Foley & Lardner LLP (57) ABSTRACT

Methods and systems are described herein for identifying the location and nature of any blur within one or more images received as a user communication and generating an appropriate correction. The system utilizes a first machine learning model, which is trained to identify blurred components of inputted images and determine whether the blurred components are located in portions of the inputted images comprising textual information. The system may apply a corrective action selected by the first machine learning model, which may comprise stitching blurred images together to a sharp product image and/or some other method appropriate for rectifying images received.

18 Claims, 4 Drawing Sheets

SYSTEMS AND METHODS FOR IDENTIFYING AND CORRECTING BLURRED COMPONENTS WITHIN IMAGES

BACKGROUND

In recent years, the use of artificial intelligence, including, but not limited to, machine learning, deep learning, etc. (referred to collectively herein as artificial intelligence models, machine learning models, or simply models) has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and despite the wide-ranging number of potential applications, practical implementations of artificial intelligence have been hindered by several technical problems. First, artificial intelligence often relies on large amounts of high-quality data. The process for obtaining this data and ensuring it is high-quality is often complex and time-consuming. Second, despite the mainstream popularity of artificial intelligence, practical implementations of artificial intelligence require specialized knowledge to design, program, and integrate artificial intelligence-based solutions, which limits the amount of people and resources available to create these practical implementations. Finally, results based on artificial intelligence are notoriously difficult to review as the process by which the results are made may be unknown or obscured. This obscurity creates hurdles for identifying errors in the results, as well as improving the models providing the results. These technical problems present inherent challenges with attempting to use an artificial intelligence-based solution in automatically detecting and amending blurred components in client communications.

SUMMARY

Methods and systems are described herein for novel uses and/or improvements to artificial intelligence applications. As one example, methods and systems are described herein for using artificial intelligence for text extraction. In particular, the methods and systems relate to identifying the location and nature of blurs in images and generating an appropriate correction. These methods and systems also overcome the technical problems that plague existing solutions.

For example, existing solutions are limited to flagging an image as too blurred for text extraction. As such, existing systems have to send blurred images for manual review, even if the blur does not materially affect the purposes for which the images are used. This creates an inaccurate and inefficient solution as manual review is costly in terms of time and energy. Furthermore, manual review can delay the prompt transmission of time-sensitive data and poses an inherent security risk if the information in reviewed images contain confidential data. However, the difficulty in adapting artificial intelligence models for this practical benefit faces several technical challenges such as the lack of an established framework to identify the location and cause of blurs in images, the inability of current systems to determine an appropriate response to blurs, and the lack of an effective method to correct the blur automatically.

To overcome these example technical deficiencies in adapting artificial intelligence models for this practical benefit among other issues, methods and systems disclosed herein which may determine whether the blurred components occur within textual information, identify the error type from a plurality of possibilities, and apply a remedy based on the identified error type. For example, the system may use data-assisted methods that stitch high-quality parts of images together to produce a sharp result; the system may apply a filter or convolution to fix known simple errors; the system may request new images upon determining the first images need extra correction. Accordingly, the methods and systems provide efficient, automatic, and accurate identification and rectification of blurs within images received.

In some aspects, methods and systems are described herein for identifying blurring of images received as part of a client communication. The system may receive, from a first user, a first user communication comprising a first image, wherein the first image comprises first textual information and first non-textual information. The system may generate a first feature input based on the first user communication. The system may input the first feature input into a first machine learning model, wherein the first machine learning model is trained to identify blurred components of inputted images and determine whether the blurred components are located in portions of the inputted images comprising textual information. The system may receive a first output from the first machine learning model. The system may determine based on the first output, whether the first image has a first blurred component and whether the first blurred component is located at the first textual information. The system may, in response to determining that the first image has the first blurred component and that the first blurred component is located at the first textual information, performing a first corrective action to the first image.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
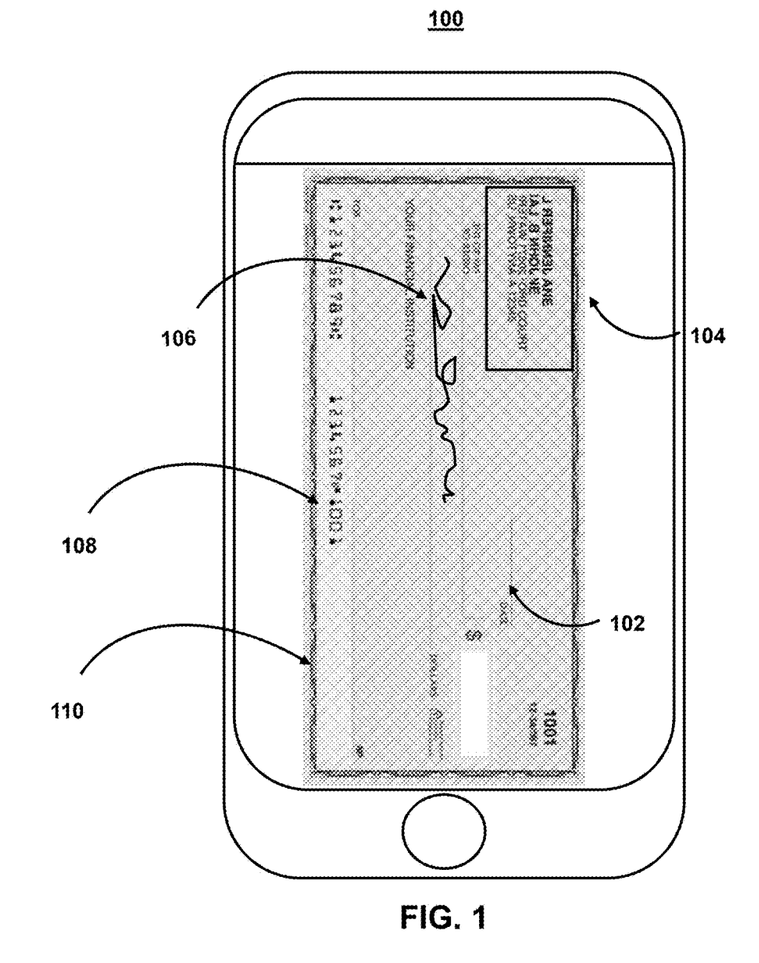
FIG. 1 shows an illustrative diagram for the front end for receiving images from a user, in accordance with one or more embodiments.

FIG. 1 shows an illustrative diagram for the front end, which may include a user interface, for receiving images from a user, in accordance with one or more embodiments. For example, FIG. 1 shows a device taking a picture with its camera (and/or other content capture device) and passing the image into a user interface (component 102) of the system (e.g., a mobile application and/or messaging application). The system may receive such communications, which may include images, from users. The system may also process images received in the ways described below. For example, the system may use one or more artificial intelligence models (including machine learning models, neural networks, etc.), referred to herein collectively as machine learning models or simply "models." The system may use any number of methods, including but not limited to, neural networks or convolutional neural networks to learn to identify blurs within images received as part of a communication and choose the correct response.

As referred to herein, a "user interface" may comprise a human-computer interaction and communication in a device, and it may include display screens, keyboards, a mouse, and the appearance of a desktop. For example, a user interface may comprise a way a user interacts with an application or a website. In FIG. 1, component 102 is a user interface for receiving images. As referred to herein, "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. As referred to herein, the term "multimedia" should be understood to mean content that utilizes at least two different content forms described above, for example, text, audio, images, video, or interactivity content forms. Content may be recorded, played, displayed, or accessed by user equipment devices, but can also be part of a live performance.

As referred to herein, a "user communication" may comprise any content transmitted by a user to the system, using one or more user interfaces. In some embodiments, user communications may include pictures, which may include blurred components, or "blurs". As referred to herein, a "blur" may comprise a smudge, stain, or smear, or indistinctness which may be created by any cause or circumstance. Blurs may arise when a picture was being taken. Causes for blurs may include a camera shaking from dynamic movement of the lens during the process of capture, subject matter movement, and/or the camera angle leading to lack of focus. A blur or an obfuscation may occur when a graphical component is obscured, such as from an aberration. Issues such as motion during image capture and defocus aberrations may create blurs or obfuscations within images.

User communications, in particular images, may comprise one or more portions. As referred to herein, a "portion" may comprise any of the more or less distinct parts into which something the content may be divided or from which the content is made up. For example, a portion may be distinguished from another portion by one or more identifying characteristics. In FIG. 1, portion 104 is a portion of image 102, which in this example contains textual information. Specifically, it is the header of a check. Textual information may refer to any alphanumerical information in a picture or photograph. Portion 106 contains some handwritten text, portion 108 contains the account number, and portion 110 contains a graph. A graph (e.g., portion 110) would constitute non-textual information, which can include graphs, shapes, and any portion not fully consisting of alphanumerical characters.

As referred to herein, an "identifying characteristic" may comprise any characteristic that distinguishes one portion of a communication from another. An identifying characteristic may be media-related information (e.g., ordering, heading information, titles, descriptions, genre or category information, subject matter information, author/actor information, logo data, or other identifiers for the content provider), media format, file type, object type, objects appearing in the content (e.g., product placements, advertisements, keywords, context), or any other suitable information used to distinguish one portion from another. For example, an identifying characteristic could be the pixel location of an image, the figures or shapes contained within the image, a keyword contained in the text of an image, or any other part of a readable image. For example, a greyscale ratio, a type of data about the brightness and contrast of an image, could be an identifying characteristic. In FIG. 1, component 104 is a portion and its location and text constitute identifying characteristics.

The system may use one or more identifying characteristics to distinguish between different types of content and/or portions of content (e.g., graphic, handwritten, and/or printed content), in accordance with one or more embodiments. For example, as shown in FIG. 1, the system may receive an image or a portion of an image (e.g., image 102). Image 102 may comprise an image comprising multiple types of content (e.g., handwritten content 106, graphic content 108, and textual content 110). The system may then determine whether or not a portion of image 102 is of a particular type of content and/or attribute an importance metric to that portion. For example, the system may comprise a supervised image pattern recognition model that detects types of content (e.g., handwritten content 106, graphic content 108, and textual content 110). For example, the system may automatically recognize patterns and regularities in image 102 based on similar patterns in similar sized portions. The system may analyze image 102 to determine the placement and intensities of pixels in image 102. For example, the system may, for each extracted unit, generate a small-size image (e.g., in order to preserve processing power) and determine the pixel intensities in this image to use as mathematical representations. The mathematical representation expresses the shape characteristics of the unit which can be used to distinguish one type of content from another.

The system may then determine whether or not different portions of image 102 corresponds to different types of content. For example, the system may be trained from labeled training data (e.g., a dataset of scanned images containing different types of content). For example, the system may provide an assignment of a label (e.g., handwritten, graphic, or text) based on a series of values based on pixel data corresponding to a portion of image 102.

In some embodiments, the system may use statistical inference to determine the best label for a given instance (e.g., portion 104). For example, the system may comprise a classifier algorithm that provides an assignment of a label (e.g., handwritten, graphic, or printed content). Alternatively or additionally, the system may be a probabilistic classifier that provides an output probability of the instance being described by the given label.

The system may generate a content map for a portion, wherein the content map indicates a position of the identifying characteristic in the portion. For example, the content map may include each identifying characteristic of a given portion with the distances and/or positions indicated. For example, the system may determine the location of text within an image. The content map may define the bounds of the image as well as distinct portions within the image.

The system may determine an image type based on its content maps. For example, the system may identify that Image 100 is a bank check from a content map indicating a bank logo, a routing number line, and other identifying characteristics. In some embodiments, the system may retrieve a template for the image based on its image type, wherein the template comprises an arrangement of preset standard content maps. For example, the system may compare the image's content maps against the template to identify missing information. For example, portion 102 is empty, and this discrepancy may be noticed with reference to a template. The system may also determine an error type based on the blur and using the image's content maps in reference to its template. An error type may, for example, be an ink blot on an image. In another example, an error type could be horizontal movement of the camera when the picture was taken. The system may then determine whether or not a given portion needs a corrective action based on a detected blur. The system may determine this based on a type of content in a given portion. The system may use a multitude of methods to identify a blur, including the Fast Fourier Transform, the Haar Wavelet Transform, and the Laplacian Operator. The system may select which of the methods to use based on an initial calculation of what data is available and/or the quality of the data. For example, in response to receiving a feature input, a machine learning model may determine what data is available and/or what methods of analysis to use. For example, the first machine learning model may be trained to identify blurred components of inputted images and to determine whether the blurred components are located in portions of the inputted images comprising textual information. The machine learning model may be further trained to pre-process the feature input to determine what data is available and/or what method (or methods) of blur detection should be used.

For example, the Fast Fourier Transform method calculates the frequencies in an image at different points and compares the frequencies against a predetermined benchmark to decide whether the image is blurred or sharp. When the frequency is low compared to the benchmark, the system declares that the image is blurred. As such, the system may select the Fast Fourier Transform method (or an algorithm that uses the Fast Fourier Transform method) in response to detecting different points and/or frequencies in the image. The system may select the Fast Fourier Transform method as the Fast Fourier Transform method uses algorithms that have errors when finite-precision floating-point arithmetic is used, but these errors are typically quite small. Furthermore, Fast Fourier Transform have excellent numerical properties as a consequence of the pairwise summation structure of the algorithms thus leading to high accuracy.

The Haar Wavelet Transform examines the edge types within an image to determine whether it is blurred, and subsequently the edge sharpness to estimate the extent of the blur. Edges within images fall into the categories of the Dirac-Structure, Astep-Structure, Gstep-Structure, and Roof-Structure. Blurred images contain less Dirac-Structure and Astep-Structure. The system can therefore compute the proportions of the Dirac and Astep structures to infer whether an image is blurred. As such, the system may select the Haar Wavelet Transform method (or an algorithm that uses the Haar Wavelet Transform method) in response to detecting (e.g., with a high degree of accuracy) edge types and/or sharpness. The system may select the Haar Wavelet Transform method as the Haar Wavelet Transform method is effective in applications such as signal and image compression as it provides a simple and computationally efficient approach for analyzing the local aspects of a signal. As such, the Haar Wavelet Transform may be particularly effective when computational resources are low such as when a mobile device is used to process an image and/or run a machine learning model.

The Laplacian Operator involves overlaying a convolution matrix onto an image to find areas of rapid changes in images. A Laplacian Operator is a second derivative of a multivariate function. In this case, to apply a Laplacian Operator to the pixel locations would result in a matrix of numerical multipliers, also known as a convolution. The image is multiplied with the convolution matrix. The closer the product is to 0, the more uniform an image is, which indicates a greater probability that the image is blurred. The system may select the Laplacian Operator method as the Laplacian Operator method is effective in applications in which boundaries and/or edges are not well defined. For example, the Laplacian operator is isotropic; thus, it has the same properties in each direction.

The system may perform a corrective action to one or more images. As referred to herein, a "corrective action" may comprise any method employed to produce a sharp product image from one or more images, at least one among which contain a blur. The corrective action for any particular image may be chosen by the system, and the system may reference the image type, the error type, or the content within portions of the image to determine the appropriate corrective action.

For example, in cases where the error is caused by camera movement when the picture was taken, the system may apply a filtering convolution, which is a matrix of real-valued numbers, to attempt to sharpen the image. This is due to such blurs causing linear, unidirectional distortion of the subject matter within the image, which require the lines of pixels to be collapsed along the direction of the stretch. The system may compute a convolution matrix based on the image, and may use a learned mapping from the pixel positions and horizontal elongation in an image to the appropriate numerical array within the convolution matrix. It may then multiply the pixel brightness values against the convolution matrix to produce a sharp image.

For example, a method to perform a corrective action would be stitching images together. As referred to herein, "stitching" several images may comprise taking one or more portions from each image and combining them into a product image, using a machine learning model and/or any other suitable method. This method may be particularly helpful where there are multiple images with the same subject matter received as part of the same user communication. One or more images may assist the system in identifying an image type and thus retrieving a template, and the sharp portions of one or more images may be used to remedy others.

Figure 2:
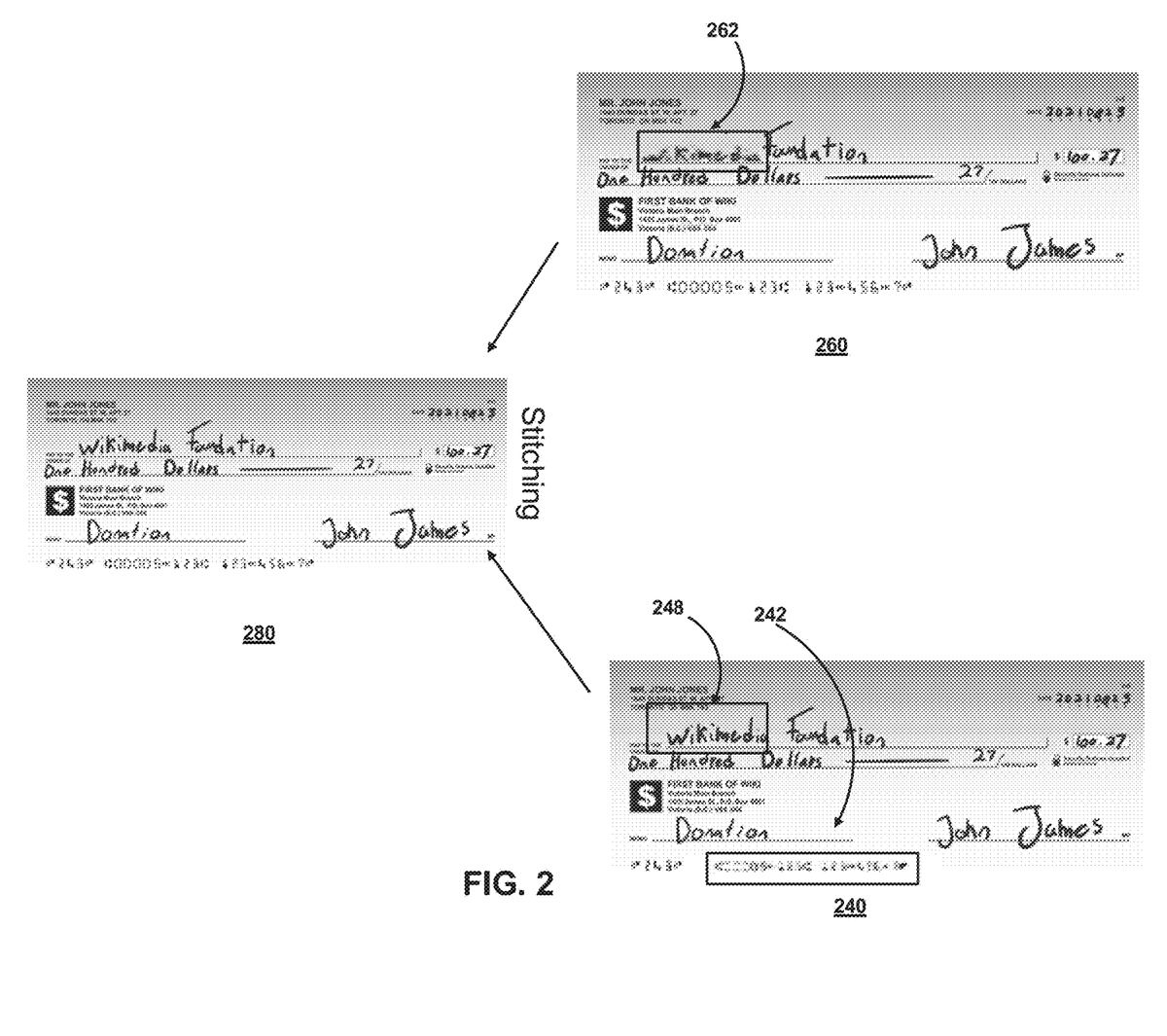
FIG. 2 shows an illustrative diagram for demonstrating the process of stitching, a corrective action, in accordance with one or more embodiments.

FIG. 2 shows an illustrative diagram for demonstrating an example of a corrective action, stitching, in accordance with one or more embodiments. FIG. 2 shows 2 images received as part of a hypothetical user communication, image 260 and image 240. They are images of the same subject matter, a check made out to a foundation. In image 260, a portion, component 262, contains a blur.

In image 240, component 242 also contains a blur. The system may, for example, use greyscale ratios to determine that portions 262 and 242 contain indistinctness and that the edges of letters and characters are fuzzy. It may hence discover that these portions contain blurs. The system may examine other identifying characteristics of these portions to determine their importance. For example, it may consider the location of these portions within the images. It may reference the template for this image type (bank cheque) in order to determine that the blur in portion 262 is salient because the recipient must be specified. Similarly, the system may determine that portion 242 contains a routing number, and thus a blur must be corrected.

The system may identify the location of both the blur in portion 262 and the blur in portion 242. For example, the system may use a pixel count of both images in reference to the template for a bank cheque. The template may contain information regarding where the portion constituting the header of a cheque can be found in terms of alignment with the edges of the image; similarly, the system may use the template to locate portion 242 as a certain number of pixels above the bottom edge and a different number of pixels right of the left edge of the image. The system may employ a machine learning model to combine direct pixel-to-pixel comparisons with gradient descent and/or other appropriate optimization techniques. The model may determine the appropriate mathematical model relating pixel coordinates in one image to pixel coordinates in another using the above techniques. In this way, the system may identify the precise pixel-location of portion 262 and/or portion 242.

It may then choose component 248, which is a sharp portion of image 240 suitable for further use, and overlay it onto image 260. In some embodiments, a machine learning model may be deployed to perform the overlaying. For example, the model may crop out portion 248 from image 240 and add portion 248 onto image 260, replacing portion 262 in the process. To do so, the model may employ a number of techniques, which may include feature detection, which automatically finds correspondences between images by identifying corners, blobs, and differences of Gaussians or other features within the portions that are to be replaced. For example, the model may find the pixel coordinates for portion 248, and correspond the coordinates to those of portion 262. It may use the corners of both portions and the top-left corner of image 260 and image 240 to aid in aligning portion 248 to image 260.

The system may also employ image registration, which involves matching features in a set of images or using direct alignment methods to search for image alignments that minimize the sum of absolute differences between overlapping pixels. In some embodiments, the system may employ the RANSAC (random sample consensus) algorithm to perform image registration. The algorithm is an iterative method for robust parameter estimation to fit mathematical models from sets of observed data points which may contain outliers. The RANSAC algorithm may distinguish between many possible alignments to find the model that fit the observed data the best, and thus produce an accurate location for an overriding portion of an image.

For example, the system may automatically smooth edges around portion 248 in image 260 to fit it within the image. To ensure that portion 248 has the correct orientation, the system may perform translation, rotation and scaling of the image. The system may adjust colors between images to compensate for exposure differences. In some embodiments, the system may perform high dynamic range merging along with motion compensation. The above methods are to blend together images and minimize the visibility of seams between images.

The result of the stitching is image 280, which is a sharp, high-quality image of the subject matter. Image 280 can be used where neither image 260 nor image 240 are high-quality enough.

Figure 3:
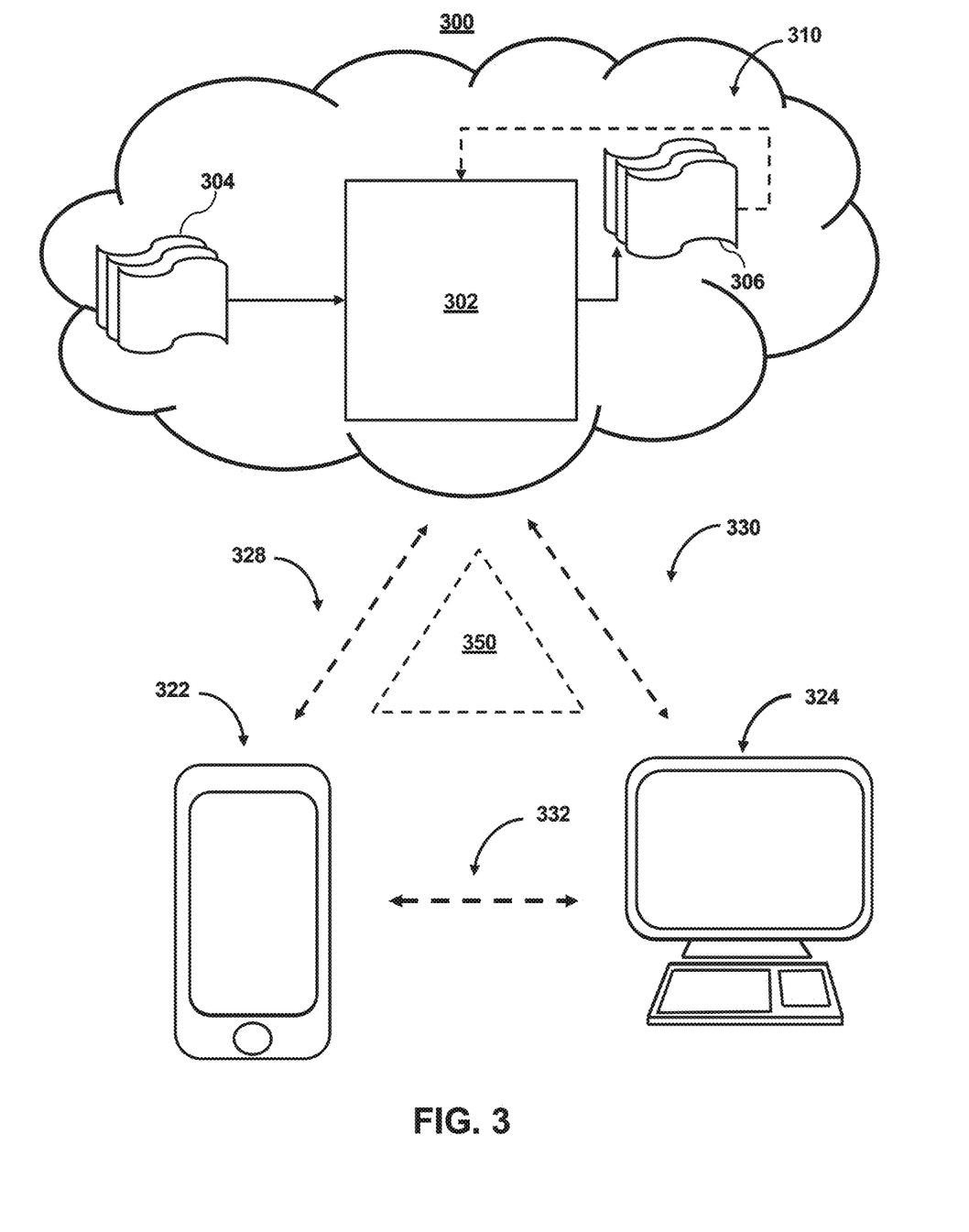
FIG. 3 shows illustrative components for a system used to send and receive communication to and from the user, in accordance with one or more embodiments.

FIG. 3 shows illustrative components for a system used to receive client communications and send requests for additional information, in accordance with one or more embodiments. For example, FIG. 3 may show illustrative components for receiving images from a user, requesting additional images from the user, or displaying options for corrective actions to the user. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may be a database configured to store user data for a user. For example, the database may include user data that the system has collected about the user through prior transactions. Alternatively, or additionally, the system may act as a clearinghouse for multiple sources of information about the user. Cloud components 310 may also include control circuitry configured to perform the various operations needed to generate interactive responses. For example, the cloud components 310 may include cloud-based storage circuitry configured to store a first machine learning model that is trained to identify and locate blurs, and classify the blurs among known error types. The cloud components 310 may include cloud-based storage circuitry configured to store a second machine learning model that is trained to stitch images together to correct blurring. Cloud components 310 may also include cloud-based control circuitry configured to apply filtering to portions of images. Cloud components 310 may also include cloud-based I/O circuitry configured to send and receive communication to the user.

Cloud components 310 may include model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., distinguishing among a plurality of error types).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302.

In some embodiments, the model (e.g., model 302) may automatically perform actions based on outputs 306. In some embodiments, the model (e.g., model 302) may not perform any actions. The output of the model (e.g., model 302) may be used to determine whether the first image has a first blurred component and whether the first blurred component is located at the textual information. The output of the model (e.g., model 302) may include selection of the first corrective action from a plurality of corrective actions.

System 300 also includes API layer 350. API layer 350 may allow the system to generate summaries across different devices. In some embodiments, API layer 350 may be implemented on user device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDoS protection, and API layer 350 may use RESTful APIs as standard for external integration.

Figure 4:
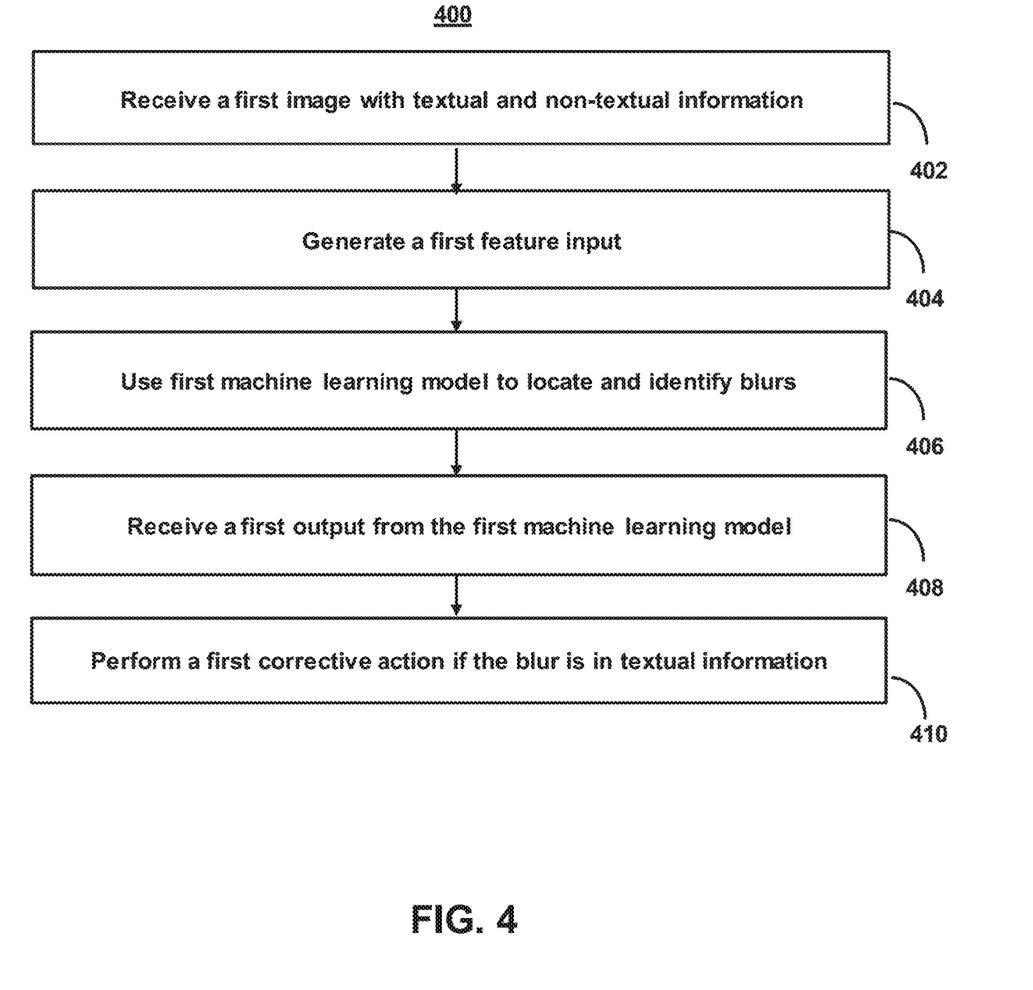
FIG. 4 shows a flowchart of the steps involved in generating the output of the first machine learning model, in accordance with one or more embodiments.

FIG. 4 shows a flowchart of the steps involved in identifying the nature and locations of any blurs within images received, and performing rectification in accordance with one or more embodiments. For example, the system may use process 400 (e.g., as implemented on one or more system components described above) in order to efficiently and automatically retouch blurred images.

At step 402, process 400 (e.g., using one or more components in system 300 (FIG. 3)) receives a first image with textual and non-textual information. For example, the system may receive, from a first user, a first user communication comprising a first image. In such cases, the first image may comprise first textual information and first non-textual information, and wherein the first textual information comprises one or more alphanumeric characters, and wherein the first non-textual information comprises one or more graphical elements. For example, the system may receive a check that a user wishes to deposit, or a proof-of-identification document requested from a client. By doing so, the system offers users a convenient and secure method of providing possibly sensitive information.

At step 404, process 400 (e.g., using one or more components in system 300 (FIG. 3)) generates a first feature input. A feature input may be a numerical vector or matrix representing information contained within an image. For example, an image that is 100 by 100 pixels, each pixel with its own brightness and color, may be translated into a feature input comprising a 100 by 100 matrix, each entry in which is a number encoding the brightness and color of its corresponding pixel.

In some embodiments, the system may determine a type of the first image. The system may retrieve a template for the type, wherein the template indicates relevant textual information. By doing so, the system can access information from previous encounters with similar images and instruct the first machine learning model more precisely.

In some embodiments, the system may determine a first portion of the first image comprising the first textual information and a second portion comprising the first non-textual information. For example, a bank check may contain a logo, which is a second portion, and routing numbers, account numbers, recipients and other text, which is a first portion. The system may find the pixel positions of the first portion and the second portion and may use a template for bank checks to assist in finding the positions. The system may determine blurred components within the first portion and apply filtering to the second portion. The above actions, which the system may perform, may generate data that may be included in the first feature input. By doing so, the system provides a comprehensive assessment of the image so that a machine learning model may more effectively identify any flaws therein.

At step 406, process 400 (e.g., using one or more components in system 300 (FIG. 3)) uses a first machine learning model to locate and identify blurs. This process may be referred to as optical document recognition. In some embodiments, the system inputs the first feature input into a first machine learning model, wherein the first machine learning model is trained to identify blurred components of inputted images and determine whether the blurred components are located in portions of the inputted images comprising textual information. By doing so, the system may pinpoint the cause and nature of any problems within the image.

In some embodiments, the system may determine the first blurred component was caused by a first error type of a plurality of error types. For example, the system may recognize that the blur was caused by camera movement during capture. For example, the system may determine various error types for a given image. By doing so, the system may select specific corrective actions (e.g., stitching together images, requesting replacement images, etc.).

In some embodiments, the system may use greyscale ratios, a type of identifying characteristic, to identify error types. For example, the system may extract from the first image a first greyscale ratio and compare the first greyscale ratio against a pre-trained threshold to identify the first error type among the plurality of error types. In such cases, the system may determine a greyscale ratio of an inputted image of a check. By doing so, the system may generate a better contrast on the image to more easily detect blurred components.

At step 408, process 400 (e.g., using one or more components in system 300 (FIG. 3)) receives a first output from the first machine learning model. In some embodiments, the system may receive a determination, based on the first output, of whether the first image has a first blurred component and whether the first blurred component is located at the first textual information. The system may receive from the first machine learning model the selection of the first corrective action from a plurality of corrective actions. For example, the system may receive instructions to stitch two images together to create a clear picture. By doing so, the system may communicate to the user its intent to perform correction and the problem it attempts to address, thus providing transparency.

At step 410, process 400 (e.g., using one or more components in system 300 (FIG. 3)) performs a first corrective action if the blur is in textual information. In some embodiments, the system may, in response to determining that the first image has the first blurred component and that the first blurred component is located at the first textual information, perform a first corrective action to the first image. The system may generate a first option for the first corrective action and a second option for a second corrective action and receive a user selection of the first option. The system may, in response to receiving the user selection of the first option, select to perform the first corrective action. By doing so, the system may ensure that any action it performs on the user communication is transparent and accountable.

In some embodiments, the system may retrieve a second machine learning model, wherein the second machine learning model is trained to stitch images together to correct blurring and process the first image using the second machine learning model. For example, the system may combine a first portion of the first image with a second portion of a second image. In some embodiments, the system may determine a location of the first blurred component in the first image, determine that the location is unblurred in a second image, extract a portion of the second image corresponding to the location, and combine the portion of the second image with the first image. By doing so, the system may produce a sharp image that is useful for further processing.

In some embodiments, the system may also generate a request to the first user for a second communication comprising an additional image comprising the first textual information and the first non-textual information. By doing so, the system has a high chance of successfully reconstructing a high-quality image.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: receiving, from a first user, a first user communication comprising a first image, wherein the first image comprises first textual information and first non-textual information; generating a first feature input based on the first user communication; inputting the first feature input into a first machine learning model, wherein the first machine learning model is trained to identify blurred components of inputted images and determine whether the blurred components are located in portions of the inputted images comprising textual information; receiving a first output from the first machine learning model; determining based on the first output, whether the first image has a first blurred component and whether the first blurred component is located at the first textual information; and in response to determining that the first image has the first blurred component and that the first blurred component is located at the first textual information, performing a first corrective action to the first image.

2. The method of any one of the preceding embodiments, further comprising: determining the first blurred component was caused by a first error type of a plurality of error types; and selecting the first corrective action from a plurality of corrective actions.

3. The method of any one of the preceding embodiments, wherein performing the first corrective action comprises: retrieving a second machine learning model, wherein the second machine learning model is trained to stitch images together to correct blurring; and processing the first image using the second machine learning model.

4. The method of any one of the preceding embodiments, wherein performing the first corrective action comprises combining a first portion of the first image with a second portion of a second image.

5. The method of any one of the preceding embodiments, further comprising: determining a location of the first blurred component in the first image; determining that the location is unblurred in a second image; extracting a portion of the second image corresponding to the location; and combining the portion of the second image with the first image.

6. The method of any one of the preceding embodiments, wherein performing the first corrective action comprises: generating a request to the first user for a second communication comprising an additional image comprising the first textual information and the first non-textual information.

7. The method of any one of the preceding embodiments, further comprising: extracting from the first image a first greyscale ratio and comparing the first greyscale ratio against a pre-trained threshold to identify the first error type among the plurality of error types.

8. The method of any one of the preceding embodiments, wherein generating the first feature input based on the first user communication further comprises: determining a first portion of the first image comprising the first textual information and a second portion comprising the first non-textual information; and filtering the second portion of the first image.

9. The method of any one of the preceding embodiments, wherein generating the first feature input based on the first user communication further comprises: determining a type of the first image; retrieving a template for the type, wherein the template indicates relevant textual information; and determining a first portion of the first textual information for identifying blurred components within.

10. The method of any one of the preceding embodiments, wherein performing the first corrective action to the first image further comprises: generating a first option for the first corrective action and a second option for a second corrective action; receiving a user selection of the first option; and in response to receiving the user selection of the first option, selecting to perform the first corrective action.

11. A tangible, non-transitory, machine-readable medium storing instructions that, when executed by a data processing apparatus, cause the data processing apparatus to perform operations comprising those of any of embodiments 1-10.

12. A system comprising one or more processors; and memory storing instructions that, when executed by the processors, cause the processors to effectuate operations comprising those of any of embodiments 1-10.

13. A system comprising means for performing any of embodiments 1-10.

What is claimed is:

1. A system for identifying blurring of electronically submitted images during optical document recognition received as part of a client communication, the system comprising:
one or more processors; and
one or more non-transitory, computer-readable media comprising instructions that when executed by the one or more processors cause operations comprising:
receiving, from a user, a user communication comprising a first image depicting subject matter, wherein one or more first portions of the first image comprises textual information and one or more second portions of the first image comprise non-textual information, and wherein the textual information comprises one or more alphanumeric characters, and wherein the non-textual information comprises one or more graphical portions;
generating a feature input based on the user communication;
inputting the feature input into a first machine learning model that performs the optical document recognition, wherein the first machine learning model is trained to (i) identify blurred components of inputted images, (ii) determine whether the blurred components are located in portions of the inputted images comprising textual information, and (iii) classify a cause of the blurred components to identify an error type;
receiving an output from the first machine learning model;
determining, based on the output, that (i) the first image has a blurred component, (ii) the blurred component is located within the one or more first portions of the first image comprising the textual information such that the blurred component causes the one or more alphanumeric characters to be obfuscated during the optical document recognition, and (iii) an error type indicating a cause of the blurred component;
selecting, based on the error type, a corrective action from a plurality of corrective actions; and
performing the corrective action to the first image to generate a second image depicting the subject matter comprising the one or more first portions comprising the textual information and the one or more second portions comprising the non-textual information, wherein the blurred component is absent from the textual information of the second image, wherein performing the corrective action comprises:
retrieving a second machine learning model trained to stitch images together to correct blurring; and
processing the first image using the second machine learning model to generate the second image.

2. A method for comprising:
receiving, from a user, a user communication comprising a first image of subject matter, wherein the first image comprises textual information and non-textual information;
generating a feature input based on the user communication;
inputting the feature input into a first machine learning model trained to (i) identify blurred components of inputted images (ii) determine whether the blurred components are located in portions of the inputted images comprising textual information, and (iii) classify a cause of the blurred components to identify an error type;
receiving an output from the first machine learning model;
determining, based on the output, that (i) the first image has a first blurred component, (ii) the first blurred component is located at a portion of the first image comprising the textual information, and (iii) an error type indicating a cause of the first blurred component;
selecting, based on the error type, a corrective action from a plurality of corrective actions;
performing the corrective action to the first image; and
generating, based on the corrective action being performed to the first image, a second image of the subject matter comprising the textual information and the non-textual information without the first blurred component.

3. The method of claim 2, wherein performing the corrective action comprises:
retrieving a second machine learning model trained to stitch images together to correct blurring; and
processing the first image using the second machine learning model to obtain the second image.

4. The method of claim 2, wherein performing the corrective action comprises:
identifying a first portion of the first image where the first blurred component is located;
identifying a second portion of a third image corresponding to the first portion of the first image; and combining the first portion of the first image with the second portion of the second image.

5. The method of claim 2, further comprising:
determining a location of the first blurred component in the first image;
determining that the location is unblurred in a third image;
extracting a portion of the third image corresponding to the location; and
combining the portion of the second image with the first image.

6. The method of claim 2, wherein the user communication comprises a first user communication, performing the corrective action comprises:
generating a request for the user for a second user communication comprising an additional image comprising the textual information and the non-textual information; and
providing the request to the user.

7. The method of claim 2, further comprising:
extracting, from the first image, a greyscale ratio; and
comparing the greyscale ratio against a greyscale ratio threshold to identify the error type among a plurality of error types.

8. The method of claim 2, wherein generating the feature input based on the user communication comprises:
determining a first portion of the first image comprising the textual information and a second portion comprising the non-textual information; and
filtering the second portion of the first image.

9. The method of claim 2, wherein generating the feature input based on the user communication further comprises:
determining a type of the first image;
retrieving a template for the type indicating relevant textual information; and
determining, based on the template, a first portion of the first image comprising the textual information relevant for identifying blurred components.

10. The method of claim 2, wherein the corrective action comprises a first corrective action, performing the first corrective action to the first image further comprises:
generating a first option for the first corrective action and a second option for a second corrective action; and
receiving a user selection of the first option.

11. One or more non-transitory, computer-readable media, comprising instructions that, when executed by one or more processors, cause operations comprising:
receiving, from a user, a user communication comprising a first image comprising textual information and non-textual information;
generating a feature input based on the user communication;
inputting the feature input into a first machine learning model, trained to (i) identify blurred components of inputted images, (ii) determine whether the blurred components are located in portions of the inputted images comprising textual information, and (iii) classify a cause of the blurred components;
receiving an output from the first machine learning model;
determining, based on the output that (i) the first image has a first blurred component, (ii) the first blurred component is located at a portion of the first image comprising the textual information, and (iii) an error type indicating a cause of the first blurred component;
selecting, based on the error type, a corrective action from a plurality of corrective actions; and
performing the corrective action to the first image to generate a second image comprising the textual information and the non-textual information without the first blurred component.

12. The one or more non-transitory, computer-readable media of claim 11, wherein performing the corrective action comprises:
retrieving a second machine learning model trained to stitch images together to correct blurring; and
processing the first image using the second machine learning model to obtain the second image.

13. The one or more non-transitory, computer-readable media of claim 11, wherein the operations further comprise:
determining a location of the first blurred component in the first image;
determining that the location is unblurred in a third image;
extracting a portion of the third image corresponding to the location; and
combining the portion of the third image with the first image.

14. The one or more non-transitory, computer-readable media of claim 11, wherein the user communication comprises a first user communication, performing the corrective action comprises:
generating a request for the user for a second user communication comprising an additional image comprising the textual information and the non-textual information; and
providing the request to the user.

15. The one or more non-transitory, computer-readable media of claim 11, wherein the operations further comprise:
extracting, from the first image, a greyscale ratio; and
comparing the greyscale ratio against a greyscale ratio threshold to identify the error type among a plurality of error types.

16. The one or more non-transitory, computer-readable media of claim 11, wherein generating the feature input based on the user communication comprises:
determining a first portion of the first image comprising the textual information and a second portion comprising the non-textual information; and
filtering the second portion of the first image.

17. The one or more non-transitory, computer-readable media of claim 11, wherein generating the feature input based on the user communication further comprises:
determining a type of the first image;
retrieving a template for the type indicating relevant textual information; and
determining, based on the template, a first portion of the textual information relevant for identifying blurred components.

18. The one or more non-transitory, computer-readable media of claim 11, wherein performing the corrective action to the first image comprises:
generating a first option for the corrective action and a second option for a second corrective action; and
receiving a user selection of the first option.

* * * * *